US011201798B2

(12) United States Patent
Zavesky et al.

(10) Patent No.: US 11,201,798 B2
(45) Date of Patent: Dec. 14, 2021

(54) AUTOMATED VIRTUAL NETWORK FUNCTION MODIFICATION

(71) Applicant: AT&T Intellectual Property I, L.P., Atlanta, GA (US)

(72) Inventors: Eric Zavesky, Austin, TX (US); James Pratt, Round Rock, TX (US); Nigel Bradley, McDonough, GA (US); Timothy Innes, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 403 days.

(21) Appl. No.: 15/972,391

(22) Filed: May 7, 2018

(65) Prior Publication Data

US 2019/0342187 A1 Nov. 7, 2019

(51) Int. Cl.
*G06F 15/173* (2006.01)
*H04L 12/24* (2006.01)
*H04L 12/26* (2006.01)
*H04L 12/46* (2006.01)

(52) U.S. Cl.
CPC ...... *H04L 41/5009* (2013.01); *H04L 12/4641* (2013.01); *H04L 43/08* (2013.01); *H04L 43/50* (2013.01)

(58) Field of Classification Search
CPC . H04L 41/5009; H04L 43/50; H04L 12/4641; H04L 43/08; H04L 41/0886; H04L 41/0893
USPC ........................................................ 709/224
See application file for complete search history.

(56) References Cited

U.S. PATENT DOCUMENTS

| 9,578,664 | B1 | 2/2017 | Paczkowski et al. |
| 9,860,164 | B2 | 1/2018 | Jilani et al. |
| 10,250,498 | B1* | 4/2019 | Bales ................ H04L 41/5009 |
| 2015/0026667 | A1* | 1/2015 | Pruss ..................... H04L 41/12 |
| | | | 717/135 |
| 2015/0234725 | A1* | 8/2015 | Cillis .................... G06F 11/263 |
| | | | 714/33 |
| 2015/0381423 | A1 | 12/2015 | Xiang |
| 2016/0301579 | A1* | 10/2016 | Djukic ............. H04L 41/5009 |
| 2017/0068559 | A1 | 3/2017 | Lee et al. |
| 2017/0126792 | A1* | 5/2017 | Halpern ............... G06F 9/5061 |
| 2017/0237647 | A1* | 8/2017 | N. ....................... G06F 9/45558 |
| | | | 709/224 |

(Continued)

FOREIGN PATENT DOCUMENTS

WO WO 2016/115896 A1 7/2016
WO WO 2017/002921 A1 1/2017

(Continued)

OTHER PUBLICATIONS

Pham et al.; "Virtual Network Function Scheduling: A Matching Game Approach"; IEEE Communications Letters; vol. 22 No. 1; Jan. 2018; p. 69-72.

(Continued)

*Primary Examiner* — Vivek Srivastava
*Assistant Examiner* — Karina J Garcia-Ching
(74) *Attorney, Agent, or Firm* — Guntin & Gust, PLC; Andrew Gust

(57) ABSTRACT

Systems and methods provide automated virtual network function modification using replicated environments and functions to measure and test modified functions against one another before implementation.

19 Claims, 10 Drawing Sheets

(56) References Cited

U.S. PATENT DOCUMENTS

| | | |
|---|---|---|
| 2017/0272523 A1* | 9/2017 | Cillis .................... H04L 41/082 |
| 2017/0279923 A1 | 9/2017 | Kumar et al. |
| 2017/0288971 A1 | 10/2017 | Jayaraman et al. |
| 2017/0371692 A1 | 12/2017 | Connolly et al. |
| 2018/0013656 A1 | 1/2018 | Chen |
| 2018/0077080 A1 | 3/2018 | Gazier et al. |
| 2018/0176088 A1* | 6/2018 | Ellappan ............. H04L 41/0893 |
| 2019/0066493 A1* | 2/2019 | Sohn ................... G06K 9/6268 |

FOREIGN PATENT DOCUMENTS

| | | | |
|---|---|---|---|
| WO | WO 2017/078790 A1 | 5/2017 | |
| WO | WO-2017078790 A1 * | 5/2017 | .......... G06F 11/3495 |
| WO | WO 2018/000197 A1 | 1/2018 | |

OTHER PUBLICATIONS

Chen et al.; "Leveraging Mixed-Strategy Gaming to Realize Incentive-Driven VNF Service Chain Provisioning in Broker-based Elastic Optical Inter-Datacenter Networks [Invited]"; IEEE/OSA Journal of Optical Communications and Networking; vol. 10 Issue 2; Feb. 2018; 8 pages.

Agarwal et al.; "Joint VNF Placement and CPU Allocation in 5G"; IEEE INFOCOM; Apr. 2018; 9 pages.

\* cited by examiner

AUTOMATED VIRTUAL NETWORK FUNCTION MODIFICATION

TECHNICAL FIELD

This disclosure relates generally to network management and, more specifically, to modifying virtualized functions in an automated manner.

BACKGROUND

To provide a service or application (generally "an application") using virtualized network platforms, a set of one or more virtual network functions (VNFs) may be instantiated on dedicated or shared hardware. For example, a VNF may be a firewall, cache, gateway, intrusion detection system, or the like. Each VNF may require one or more virtual machines (VMs) to be instantiated. In turn, VMs may require various resources, such as memory, virtual computer processing units (vCPUs), and network interfaces or network interface cards (NICs).

Given the expanding use of virtualization, VNFs are difficult to manage both in isolation and as parts of larger systems. Management of any one VNF may vary by environment and customer depending on other VNFs present, traffic patterns, user preferences, et cetera. VNF management is often performed by administrators with incomplete information and who are limited by time and resources available to make changes when needs or opportunities to modify VNFs arise.

This disclosure is directed to solving one or more of the problems in the existing technology.

SUMMARY

In an aspect, a method includes monitoring performance data of a plurality of virtual network functions; identifying a performance issue in a selected production virtual network function among the plurality of virtual network functions, wherein the selected production virtual network function is in a production environment; instantiating one or more replica virtual network functions in one or more sandbox environments based on identification of the performance issue, wherein the one or more replica virtual network functions replicate the selected production virtual network function, and wherein the one or more sandbox environments replicate the production environment; modifying the one or more replica virtual network functions according to candidate modifications based on the performance issue; evaluating the modified one or more replica virtual network functions using replicated production data; calculating one or more replica objective scores based on the evaluating step; computing a modification solution related to the performance issue based on the calculating step; and modifying the selected production virtual network function in accordance with the modification solution in response to computing the modification solution.

In another aspect, a system includes a function modifier configured to modify one or more replica virtual network functions replicating a selected production virtual network function, wherein the production virtual network function is in a production environment, wherein the one or more replica virtual network functions are instantiated in one or more sandbox environments replicating the production environment, wherein the selected production virtual network function is selected based on a performance issue, wherein modifying the one or more replica virtual network functions changes operation according to candidate modifications with respect to the performance issue, and wherein the one or more replica virtual network functions are modified in response to identifying the performance issue; a traffic replicator configured to replicate traffic to and from the selected production virtual network function, wherein the traffic is delivered to the one or more replica virtual network functions as modified; a performance monitor configured to monitor performance metrics of a plurality of virtual network functions including the selected production virtual network function and the one or more replica virtual network functions as modified, wherein the performance monitor identifies the performance issue; a modification scorer configured to calculate one or more replica objective scores based on performance data of the one or more replica virtual network functions as modified during handling of the replicated traffic; and a test comparator configured to compare the one or more replica objective scores of the selected production virtual network function and the one or more replica virtual network functions as modified, wherein comparing the one or more replica objective scores computes a modification solution, and wherein the function modifier modifies the selected production virtual network function in accordance with the modification solution in response to computing the modification solution.

According to yet another aspect non-transitory computer readable media stores instructions. When executed by one or more processors the instructions are configured to: monitor performance data of a plurality of virtual network functions; identify a performance issue in a selected production virtual network function among the plurality of virtual network functions, wherein the selected production virtual network function is in a production environment; instantiate one or more replica virtual network functions in one or more sandbox environments based on identification of the performance issue, wherein the one or more replica virtual network functions replicate the selected production virtual network function, and wherein the one or more sandbox environments replicate the production environment; modify the one or more replica virtual network functions according to candidate modifications based on the performance issue; evaluate the modified one or more replica virtual network functions using replicated production data; calculate one or more replica objective scores based on the instructions to evaluate; compute a modification solution related to the performance issue based on the instructions to calculate; and modify the selected production virtual network function in accordance with the modification solution in response to computing the modification solution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

As noted above, management of VNFs remains challenging, especially at lower levels such as by customer, by function, by device, et cetera. While larger entities may be able to utilize dedicated administrators to modify VNF operation according to goals, these administrators are still limited by their knowledge and capability and will have great difficulty adjusting to real-time changes. Smaller entities that are unable to employ dedicated administrators may discuss requests with providers or vendors, but these parties may be responsible to their own infrastructure supporting a litany of customers and unable to make changes on demand. Further, no human may be capable of understanding network conditions quickly enough to improve efficiency in real-time or achieve aspirational goals above and beyond contracted service levels. It would be desirable to develop means for reconfiguring VNFs in a rapid and automatic fashion without exposing production systems to the risks associated with frequent changes.

Systems and methods are accordingly disclosed automatically discover solutions related to VNF development or configuration. This is completed in several stages: discovery by monitoring, solving, testing, selection, implementation, and monitoring to determine outcomes and discover different or new issues. This allows preemptive and proactive exploration of problems or improvements, and provides "never offline" testing and implementation. It also allows virtualized environments to be "self-healing." It allows use of a live agent or automated tool to analyze at various granularities, from a user or device to a domain or more. Because of interdependence, solutions can be determined and implemented for single VNFs or groups of VNFs based on how a change to one does or may impact others.

Figure 1A:
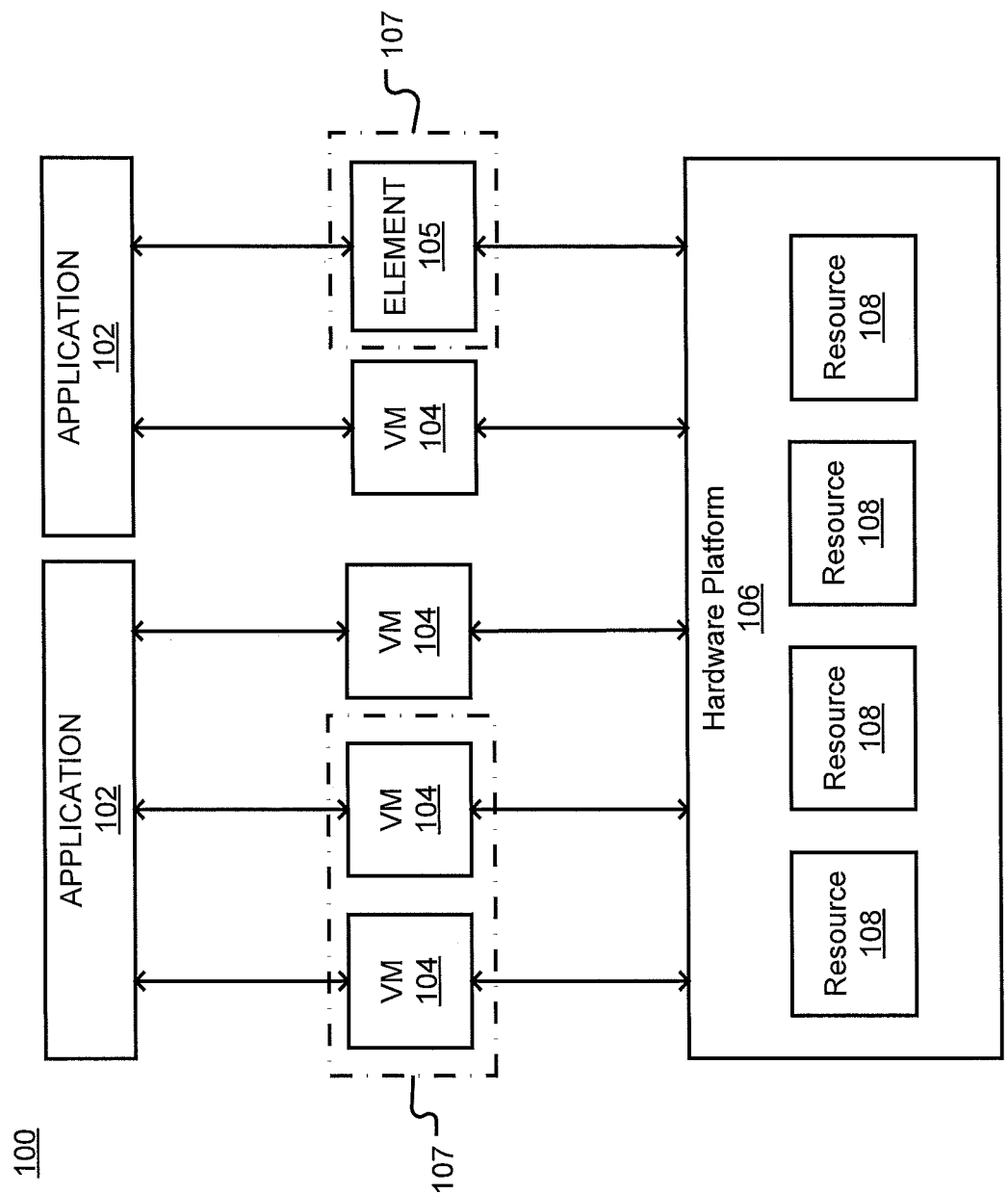
FIG. 1A is a representation of an example network.

Turning to the drawings, FIG. 1A is a representation of an example network 100. Network 100 may include one or more applications (which in turn may include one or more VNFs) implemented on general purpose hardware, such as in lieu of having dedicated hardware for every network function. That is, general purpose hardware of network 100 may be configured to run applications. In embodiments, general purpose hardware may be combined with special purpose hardware, within hardware platform 106, embodied as element 105, or distributed elsewhere within a network to which elements of FIG. 1A are communicatively coupled, to achieve particular functionality.

Each application 102 may use one or more VMs 104 or elements 105 to operate. Each VM 104 may have a VM type that indicates its functionality or role. Examples of VMs 104 include gateways (GWs), firewalls (FW), routers, real-time analytics, customer edges (vCEs), provider edges (vPEs), proxies, rendezvous points (RPs) or the like. Similarly, each element 105 may have an element type that indicates is functionality or role. Examples of elements 105 include an ingress point, an egress point, a non-virtualized function, or the like. While specific reference may be made to VMs 104 or groups (which may include one or more elements 105), this is for explanation to show that the deployment plan may not necessarily limited to virtual components in all implementations. As noted earlier, while VMs are discussed for ease and consistency of explanation, this focus may be substituted by or supplemented with focus on containers. For example, one or more of VMs 104 or elements 105 can be a container. Similarly, various clients can be substituted for or comprise application 102, including but not limited to databases, webservers, media transcoders, other cloud applications, et cetera.

Each VM 104 may consume various network resources from a hardware platform 106, such as resources 108. For example, resources 108 may include one or more virtual central processing units (vCPUs), memory, or a network interface cards (NIC). Resources 108 can be dedicated or commingled in support of one or more VM 104, with such utilization or assignment being performed dynamically, and need not conform to any particular arrangement (e.g., multiple central processing units (CPUs) can support one VM, multiple VMs can be supported by one CPU, et cetera). Various rules can be used in such allocation.

Figure 1B:
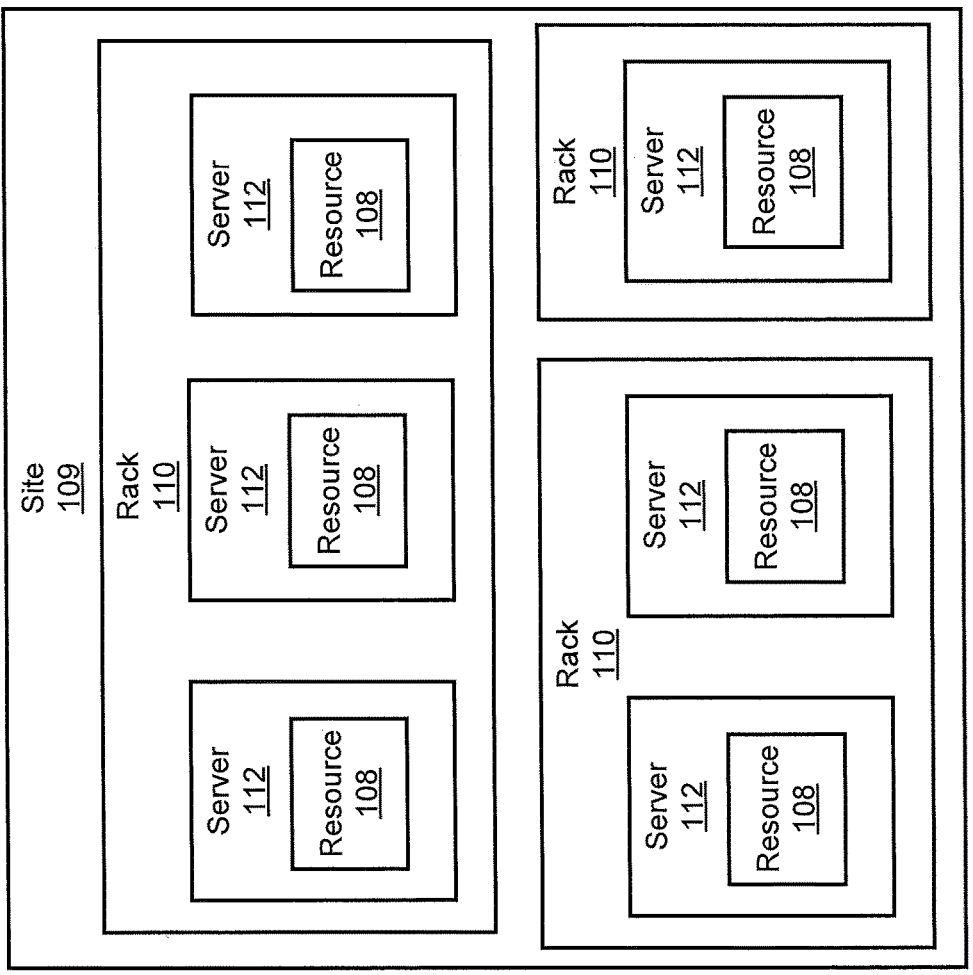
FIG. 1B is a representation of an example hardware platform for a network.
Figure 1B:
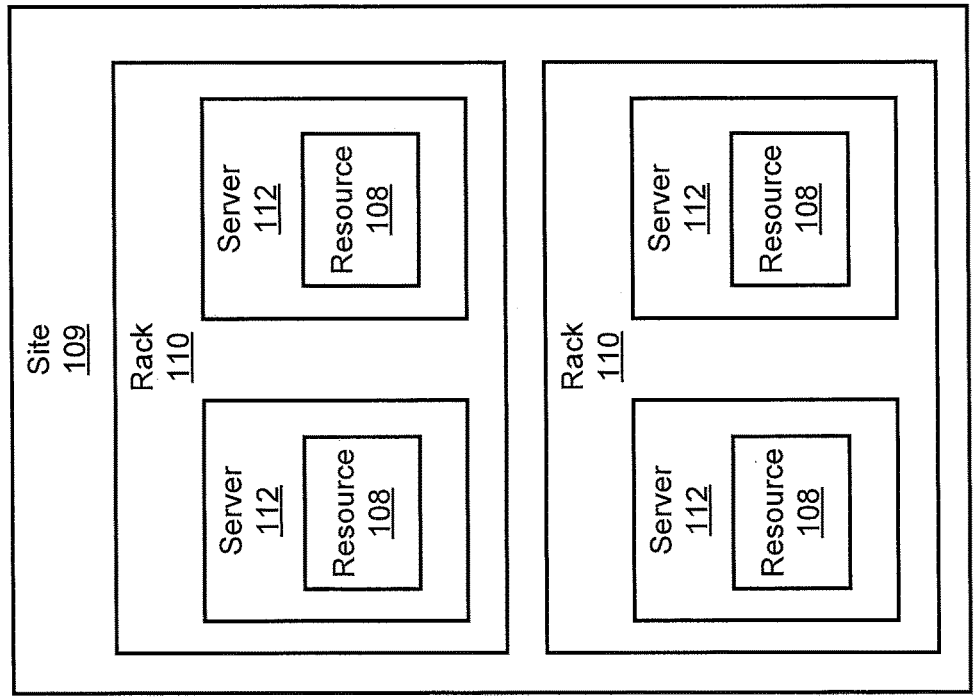

While FIG. 1A illustrates resources 108 as collectively contained in hardware platform 106, the configuration of hardware platform 106 may be further delineated. FIG. 1B provides an example implementation of hardware platform 106.

Hardware platform 106 may comprise one or more sites 109. For example, a site 109 may be a room, building, or geographic location in which resources 108 are located. For example, site 109 may be a datacenter. Each site 109 may comprise one or more racks 110. In an aspect, rack 110 may refer to the physical housing or platform for multiple servers or other network equipment. In an aspect, rack 110 may also refer to the underlying network equipment. Each rack 110 may include one or more servers 112. Server 112 may comprise general purpose computer hardware or a computer. In an aspect, rack 110 may comprise a metal rack, and servers 112 of rack 110 may comprise blade servers that are physically mounted in or on rack 110.

Each server 112 may include one or more network resources 108, as illustrated. Servers 112 may be communicatively coupled together (not shown) in any combination or arrangement. For example, all servers 112 within a given site 109 or rack 110 may be communicatively coupled. As another example, servers 112 in different racks 110 may be communicatively coupled. Additionally or alternatively, racks 110 may be communicatively coupled together (not shown) in any combination or arrangement.

The characteristics of each site 109, rack 110, and server 112 may differ. For example, the number of racks 110 within two sites 109 may vary, or the number of servers 112 within two racks 110 may vary. Additionally or alternatively, the type or number of resources 108 within each server 112 may vary. In an aspect, rack 110 may be used to group servers 112 with the same resource characteristics. In another aspect, servers 112 within the same rack 110 may have different resource characteristics.

A single application 102 may include many functional components (e.g., VMs 104 and elements 105. These components may have dependencies upon each other and intercommunication patterns with certain quality of service (QoS) requirements, such as locality, high availability, and security. Consequently, placement decisions—that is, decisions on how (and where) to implement VMs 104 and other elements 105 within hardware platform 106—may be based on all VMs 104 in which the components of application 102 run, including the dependencies of those VMs 104, holistically.

Such QoS requirements may be domain or application specific. Thus, a deployment plan for assigning resources 108 to VMs 104 of an application may depend upon certain limitations and requirements of both network 100 and application 102, such as the QoS requirements of a given application 102 and the underlying infrastructure of network 100. As all of this information is not typically accessible to both the application provider (that may not have access to network infrastructure details) and the cloud provider (that may not have access to the functionality of application 102), an abstraction may be used to create a deployment plan for application 102, where creation of the deployment plan can occur without knowledge or consideration of the specific infrastructure information.

A deployment plan may assign VMs 104 to particular resources 108 in accordance with one or more rules in order to account for the requirements of application 102 supported by such VMs 104. These rules may be based on abstracting the requirements of application 102, such as by levering the application provider's knowledge on its application 102 to yield a concise and flexible representation of the locality, availability, and security requirements of application 102 without needing to capture the specifics of the cloud infrastructure underlying network 100. The deployment plan may be based on one or more affinity rules, diversity (or anti-affinity) rules, exclusivity rules, or pipe rules. The deployment plan may further be based on nesting groupings (e.g., rules or sets of VMs 104). For example, the abstraction may provide for certain VMs 104 to be grouped together, so that rules may be applied to groups of VMs 104 or to individual VMs 104. A group may include one or more VMs 104, or other elements 105, such as ingress points, or the like. For example, FIG. 1A shows two example groups 107.

FIGS. 1A and 1B provide an environment for systems described herein, which can be include host systems, guest systems, or orchestration systems. In an example, VNFs implemented on such environments can include a virtual Mobility Management Entity (vMME), a virtual System Architecture Evolution with Packet Data Network Gateway and Serving Gateway (vSAEGW), a virtual Home Subscriber Server (vHSS), a virtual Diameter Routing Agent (vDRA), virtual firewall (vFW), virtual router (v-Router), et cetera, and other virtualized functions supporting wireless networks.

For example, a vMME can be defined in terms of mobility management entity (MME) functions or subcomponents, each of which is supported alone or in combination by one or more VMs 104 (which can be dedicated or shared VMs actively engaged or available in standby). VMs 104 are supported by resources 108 of hardware platform 106 and/or other hardware platform. CPU time from resources 108 is allocated to VMs 104 for the vMME.

Figure 1C:
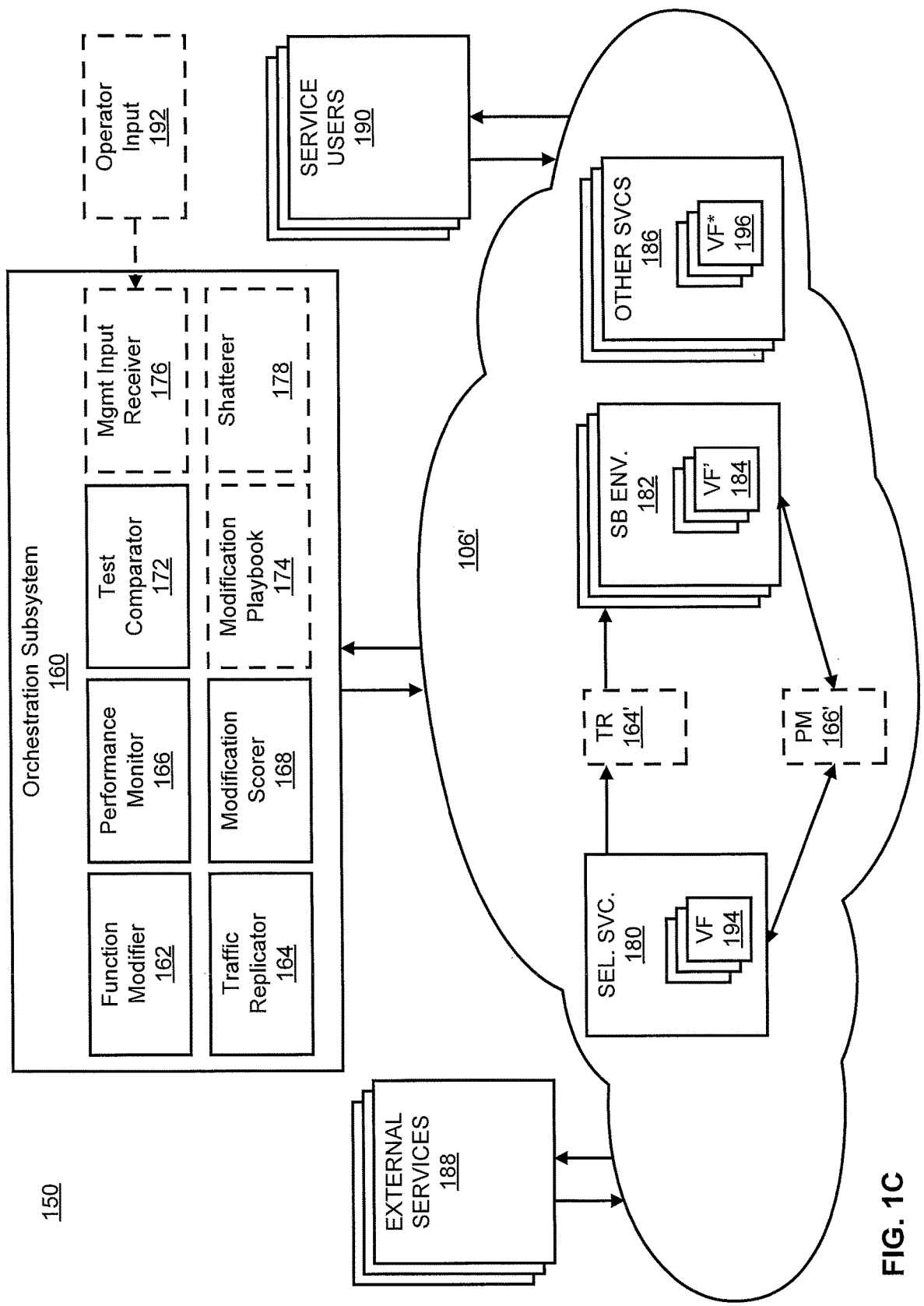
FIG. 1C is a representation of an example system for implementing automated VNF modification.

FIG. 1C illustrates an example system 150 for implementing automated modification of virtualized functions as supported by environments like those of FIGS. 1A and 1B. FIG. 1C includes orchestration subsystem 160 and hardware platform and hosted VMs 106'. While arrows in FIG. 1C illustrate example data flow or support relationships, in alternative or complementary embodiments directions shown may be reversed or each connection may be two-way. Further, elements shown without connections may still be operatively coupled to different elements shown or other elements within a network. More, orchestration subsystem 160 may actually be implemented in the cloud using hardware platforms and hosted VMs 106' and other blocks shown as separate elements for purposes of explanation may be commingled, combined, located elsewhere (logically or physically), et cetera, without departing from the scope or spirit of the innovation.

Hardware platforms and hosted VMs 106' can include a plurality of services including selected service 180 (having VNF 194) and other services 186 (having VNFs 196). These services are used by service users 190, who communicate traffic to and from devices they operate to leverage services. These services (and other interoperable or interconnected components of hardware platforms and hosted VMs 106') also receive traffic from and send traffic to external services 188. Other sources and destinations of inbound or outbound traffic can be used without departing from the scope or spirit of the innovation.

Orchestration subsystem 160 includes a performance monitor 166. Performance monitor 166 is configured to monitor performance metrics of a plurality of virtual network functions. These include VNFs of selected service 180 (VF set), other services 186 (VF* set), and VNFs instantiated within hardware and hosted VMs 106'.

Selected service 180 (or a selected VNF 194 thereof) is selected (among all services or VNFs) based on discovery of a performance issue by performance monitor 166. Discover can be automated by performance monitor 166 or identified by a user or administrator. Performance issues can be or relate to, e.g., Key Performance Indicator (KPI) values, SLA, or other measurements. Specific examples of these can include latency, throughput, jitter, shortest path, faulty hardware in the middle, context, business SLA, peer to peer connectivity, flow rate, change of network connectivity paths, movement of users between networks or handoffs, CDR (detail record audit) stability, responsiveness to customer demands (e.g., in time, in demands resolved, et cetera). These can be caused by loading, bottlenecks, system or hardware age, location separation of services, malicious attacks, et cetera. Identification of a performance issue can vary depending on network conditions, customer, VNF, et cetera. For example KPI values indicating an "issue" may be less or more for different VNFs or customers, or depending on overall network traffic and loading. Performance issues can also be permissive, by request, or aspirational as described herein. In embodiments, multiple performance issues can be observed or monitored simultaneously. Where two or more performance issues are identified, they can relate to one or more VNFs for one or more customers. For a performance issue being addressed through modification of a VNF (which can be a given iteration or one of several such modifications being concurrently pursued), the VNF related to the performance issue can be referred to herein as a "selected production VNF." While this term is utilized in the singular, it is understood that, due to interrelationships between VNFs or due to multiple influences on a single performance issue, multiple VNFs may comprise a selected production VNF as used herein. In other embodiments, performance monitor 166 can observe performance data but performance issue identification can be conducted by another element. VNFs which are monitored or selected for testing, modification, or other action can include VNFs supporting the cloud, specialized or proprietary VNFs, or combinations thereof. Different VNFs can be simultaneously monitored for different customers, and different performance data or thresholds for identification of a performance issue can vary by VNF, by customer, by time, by network condition or resources available, or along according to other VNF characteristics or network context. Where multiple performance issues are identified, they can be prioritized based on severity, resource consumption, customer, VNF characteristic, or other parameters.

Performance monitor performs continuous performance monitoring during various changes within system 150. Thus, performance monitor monitors the selected production VNF of the selected service 180 while modifications are being assessed, other VNFs, and also replica VNFs in replicated sandbox environments as described herein.

Performance monitor 166 can be arranged, physically or logically, remote to selected service 180 and/or other services, functions, or environments monitored. However, in alternative or complementary embodiments, performance monitor 166' can be deployed to the cloud, an environment, a service, a VNF, et cetera, as an agent thereto or a standalone function. In this manner, performance can be monitored flexibly and in manners which are consistent and/or suited to the particular resources available at given network locations.

Orchestration subsystem 160 also includes function modifier 162. Function modifier 162 is configured to modify one or more VNFs. In embodiments, function modifier 162 can create sandbox environments 182, which are test environments which can be arranged to test or develop functionality without impacting a production environment of selected service 180 being used in the real world. Sandbox environments 182 can replicate production environments of selected service 180 to allow for realistic development and testing of replica VNFs 184 or network functionality. The sandbox environments 182, which receive replicated traffic as described herein, can be conceived as "shadow networks" which model the current state of a parent network to allow prediction and modeling of effects of sudden changes to the environmental conditions, VNFs, or other configuration. In embodiments, function modifier 162 can also instantiate new VNFs. In embodiments, these new VNFs can be replicas of other VNFs, such as the selected production VNF (replica VNFs 184). Thus, function modifier 162 can create, within hardware and hosted VMs 106', mirrors of VNF (or service) within an environment. Thereafter, function modifier 162 can modify some or all of replica VNFs 184 (or other newly-instantiated VNFs) and selected production VNF 194 (or other preexisting VNFs), regardless of environment. While function modifier 162 is described herein as creating, destroying, instantiating, or terminating environments, services, or VNFs, other elements of orchestration subsystem 160 (or other network elements) can share or exclusively control such functionality without departing from the scope or spirit of the innovation.

To assist with resolving the performance issue identified in a selected production VNF among VNFs 194, function modifier 162 modifies replica VNFs 184 to determine possible alternative VNF configurations or replacement VNFs to resolve the performance issue. Function modifier 162 is thus configured to change operation of replica VNFs 184 in response to identifying the performance issue. These changes can be based on candidate modifications with respect to the performance issue. A "candidate modification" is one possible modification which is selected to be instantiated in a replica for performance monitoring and testing. These can be identified through solving mathematical problems subject to costs or constraints, identification in a playbook as discussed herein, provisioning from a peer system or administrator, et cetera. While candidate modifications may be optimizations or "ideal" solutions, it is understood that the disclosure herein is not limited exclusively to optimization, and more, that costs, preference for a particular outcome, or the presence of other variables which suffer by optimizing particular variables may dictate that candidate modifications or an ultimately selected modification not be an optimization. Candidate modifications can further be defined by artificial intelligence or machine learning based on historical data and performance of VNFs and the larger environments in which they are instantiated.

Orchestration subsystem 160 also includes traffic replicator 164. Traffic replicator 164 is configured to replicate traffic to and from the selected production VNF after instantiation of the replica VNFs 184'. This replicated traffic can include all traffic directed to and originating from the selected production VNF. The replicated traffic is directed to replica VNFs 184 (by traffic replicator 164 or another element) to allow realistic measurement and testing of the replicated VNFs, against the selected production VNF and one another, in view of actual network conditions and real-time or near real-time load.

Traffic replicator 164 can be arranged, physically or logically, remote to selected service 180 and/or other services, functions, or environments monitored. However, in alternative or complementary embodiments, traffic replicator 164' can be deployed to the cloud, an environment, a service, a VNF, et cetera, as an agent thereto or a standalone function. In this manner, traffic can be replicated flexibly and in manners which are consistent and/or suited to the particular resources available at given network locations.

In embodiments, traffic replicator 164 can modify traffic to replicated VNFs to provide performance measurements, scoring, and/or testing beyond or distinct from real-world loads. In this regard, traffic replicator 164 may include a traffic generation or estimation function. More, traffic replicator 164 may, in embodiments, conduct tuning, such as step-wise increases in compute resource, or step-wise increases in a physical action for IoT implementations, one variation at a time.

Orchestration subsystem 160 also includes modification scorer 168. Modification scorer 168 is configured to calculate one or more replica objective scores based on performance data of the one or more replica virtual network functions as modified during handling of the replicated traffic. Scores can be calculated in terms of costs and benefits. For example, a virtualized router could expand the number of ports in its routing table to accommodate an increase in traffic and thus increasing its throughput. But this would also increase its computing needs (CPU cycles), which increases costs. Various functions can be utilized to weigh costs and benefits to produce an objective score.

In embodiments, modification scorer 168 employs an adversarial technique. Adversarial techniques can pit different options against one another according to modified cost models or through hallucination of data-points. This makes solutions which miss modeled points by over-fitting more costly than traditional cost vectors which may allow solutions to "cheat" by relying on a current model for its applicability in feature space which has not been evaluated.

Orchestration subsystem 160 also includes test comparator 172. Test comparator 172 is configured to compare the one or more replica objective scores of the selected production VNF and the replica VNFs as modified. This comparison is used to compute a modification solution, i.e., select a modification to apply to the selected production virtual network function to modify its operation with respect to the identified performance issue. Based on the solution determined by test comparator 172, function modifier 162 modifies the selected PVNF in accordance with the modification solution in response to computing the modification solution.

In particular embodiments, orchestration subsystem 160 can include a modification playbook 174. Modification playbook 174 can include a database of "plays" (at least some of which compose a candidate set of candidate modifications for VNFs) and, in embodiments, associated functionality for searching, comparing, providing, and storing "plays." In such embodiments, function modifier 162 is configured to search modification playbook 174 for the candidate modifications related to the performance issue and identify candidate modifications there from. These plays can be implemented in replica virtual network functions 184 More, where candidate modifications are identified in another manner (e.g., function modifier 162 defines performance issue as a mathematical problem and develops varying solutions subject to constraints or costs), identified modifications can be stored in modification playbook 174.

In an embodiment, modification playbook 174 can be populated through directed or random analysis determining alternative configurations or variants for VNFs (nodes) in a network. A network model can mirror a production environment for testing. A VNF is selected and modified, tuned, or changed in configuration to determine costs and benefits associated with each modification in view of interdependencies and the larger environment. Overall system performance (e.g., the replicated mirror environment) can be tested to determine the outcomes associated with modification of the VNF. This defines a play for storage in the playbook. Once performance associated with the modification is determined, other modifications on the relevant VNF can be tested, defining other plays for the particular VNF. Thereafter, a new VNF can be selected, and the process repeated, until the playbook is populated with plays (which may, but need not be, optimal or optimized solutions in view of particular conditions) for all variants of all VNFs. The performance and plays can be mapped to environmental conditions or network events, thereby providing possible (and in some cases, ideal) configurations or modifications for particular conditions (e.g., increased demand, reduced resource(s)) and network topology (or topologies).

In particular embodiments, orchestration subsystem 160 can include a management input receiver 176. Management input receiver 176 is configured to receive an external bias related to one or more of the candidate modifications. Scoring or testing the performance metrics and/or objective scores by test comparator 172 is weighted according to the external bias. In this fashion, an administrator or user may bias the outcome of automated modification selection, providing human-on-the-loop or human-in-the-loop control to leverage institutional knowledge and human thought in the process. Human input can be provided with a weight factored into scoring and testing. In embodiments, human input can be provided as an override (e.g., where a short-term solution is not desirable), or alternatively a human can be overridden (e.g., where the human selection results in sustained SLA impact) based on performance, scoring, testing, weighting, et cetera.

In particular embodiments, orchestration subsystem 160 can include a shatterer 178. Shatterer 178 is configured to shatter the selected production virtual network function into virtual constituents. Once shattered, monitoring performance data of the replica virtual network functions as modified is conducted on a virtual constituent level. When shattered, VNF performance and modifications are assessed at higher granularity thereby facilitating more precise and specific modifications.

In embodiments, shatterer 178 and modification playbook 174 can be utilized simultaneously. In such embodiments, shatterer 178 is configured to shatter the candidates of the candidate set from the modification playbook into play constituents. Function modifier 162 is, in such embodiments, configured to search the modification playbook for the candidate modifications related to the performance issue by matching play constituents to virtual constituents in identifying candidate modifications.

Figure 2A:
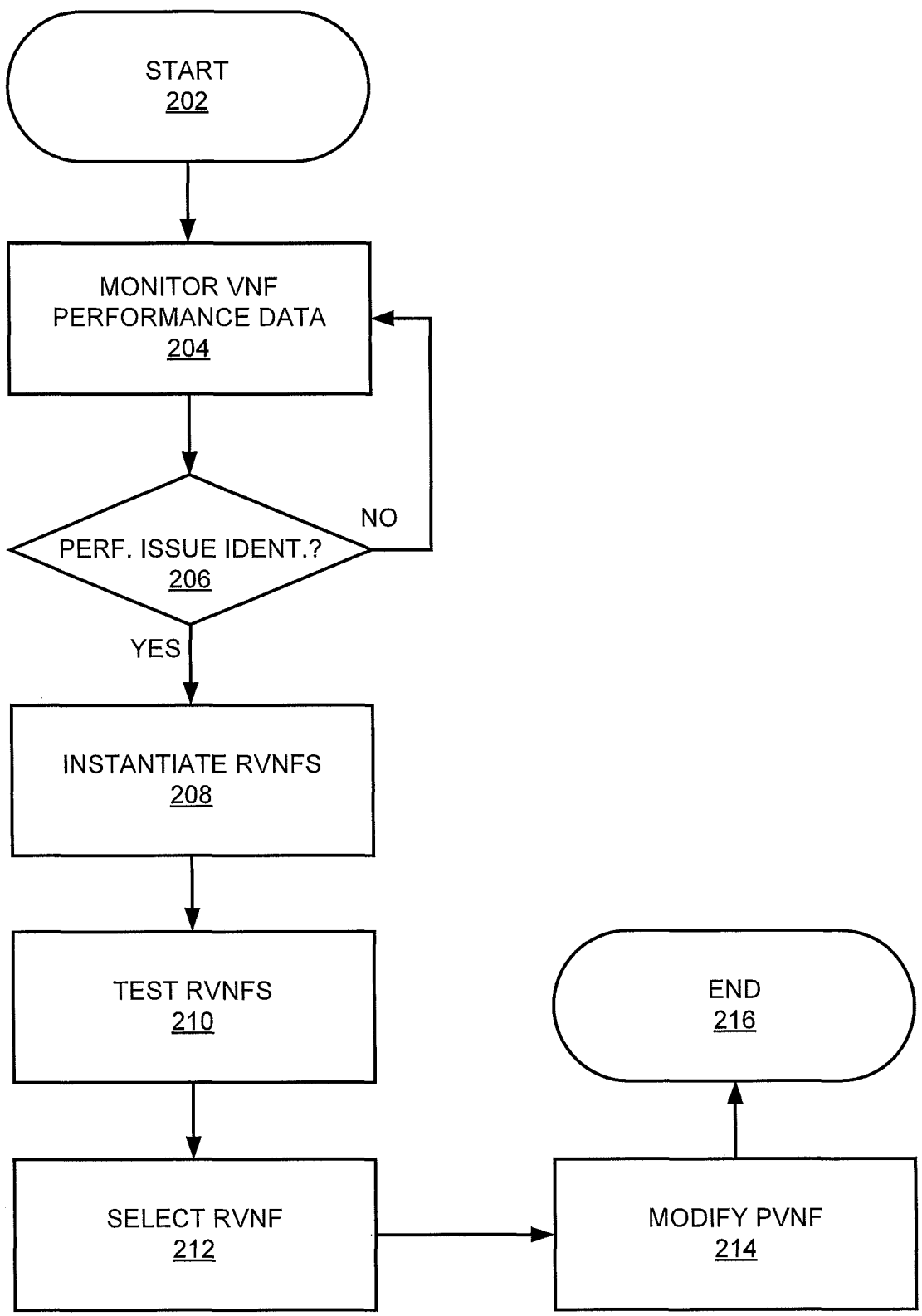
FIG. 2A is a method that may be used to implement automated VNF modification.

Turning to FIG. 2A, illustrated is an example methodology 200 for automatically or continuously modifying VNFs. Methodology 200 begins at 202 and proceeds to 204 where performance data (and in embodiments other data) from a plurality of VNFs is monitored. Such monitoring can monitor one, some, or all VNFs simultaneously in various environments (e.g., production, sandboxes) to observe, analyze, and store performance data. Such monitoring can monitor infrastructure VNFs and/or proprietary or custom services for customers or users, and can involve one or more different VNFs for one or more different customers. In various embodiments, all VNFs accessible through the network or subsets thereof can be simultaneously or serially monitored (or be monitored in various combinations over time).

At 206, a determination is made as to whether a performance issue is identified. Performance issues can relate to, e.g., KPIs, SLA, or other measurements. More, requests related to specific services (e.g., from a customer seeking to increase performance for one service in particular) may define aspirational performance goals that, while not required by an agreement between a provider and customer, increase customer satisfaction and may not impose substantial cost on the vendor. For example, a user seeking to improve performance of a particular high-demand service may be satisfied with the contracted service level, but request that, if available, VNFs be modified to optimize performance of the high-demand service. When and where resources are available, this VNF modification can be enabled, but the VNF(s) may be toggled to a different setting (or rolled back to the pre-modification setting) when conditions do not support this configuration without imposing additional costs.

Still further, high-frequency identification and resolution of performance issues can be identified. For example, fleeting performance issues based on irregular traffic patterns, and/or traffic patterns which only occur for short periods of time, may not harm overall KPI values or SLA impact. However, rapidly adjusting for these changes may increase available resources, efficiency, or prevent later-developing performance issues by addressing them before they compound over time or coincide with other irregular network events that in combination might result in a more significant impact.

If a performance issue is not identified at 204, methodology 200 recycles to 204 where monitoring can continue.

Figure 2B:
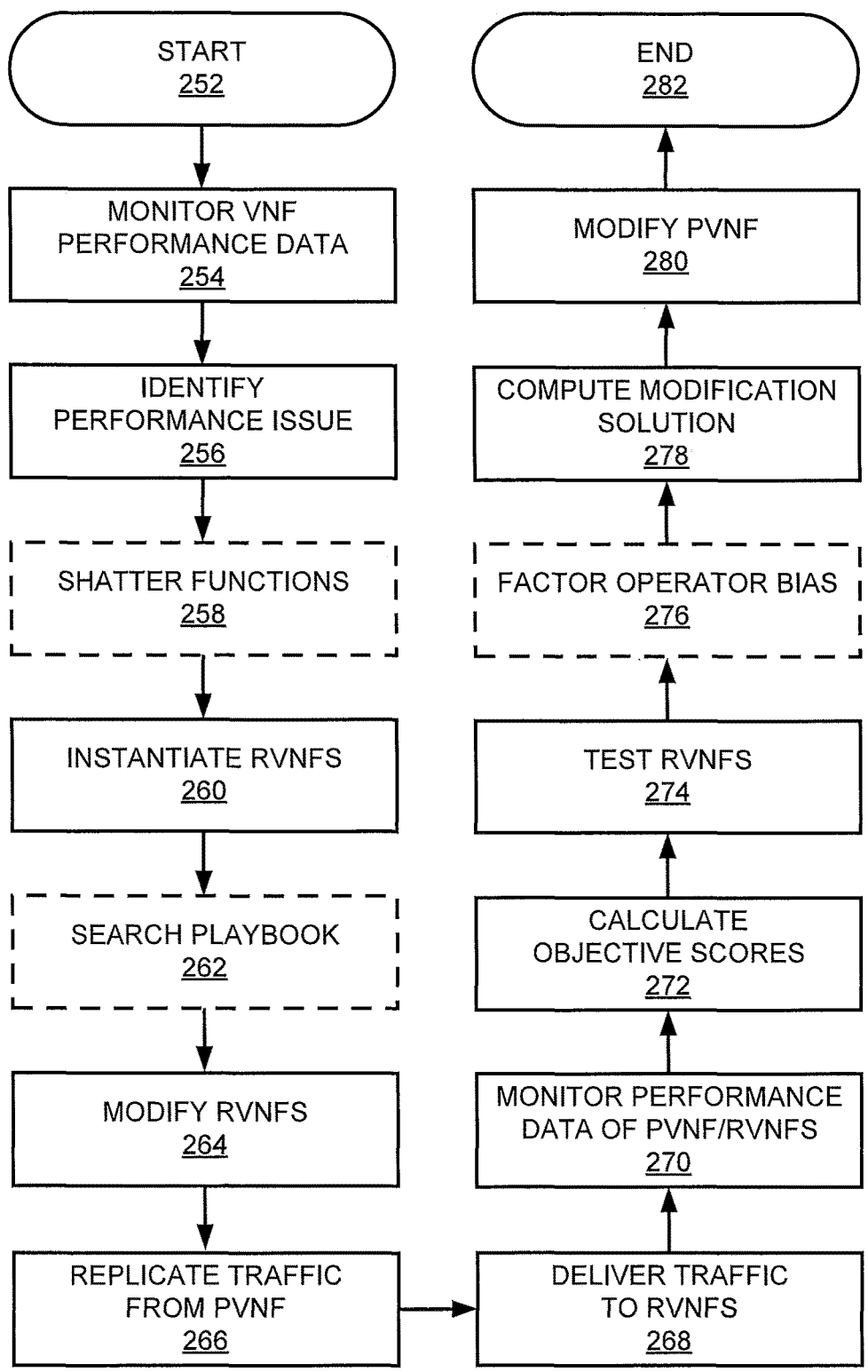
FIG. 2B is a method that may be used to implement automated VNF modification.

However, if a performance issue is identified at 204, methodology 200 proceeds to 208 where replica VNFs are instantiated, based on a selected production VNF identified as having or relating to the performance issue, in sandbox environments which are replicas of the production environment. One or more separate and replica VNFs are instantiated in one or more separate and distinct sandbox environments. The replica VNFs are modified to provide a testable example of an alternative VNF or configuration to address the performance issue. Such modification can occur before instantiation (e.g., modifications for VNFs selected or identified before instantiating replicas) or after instantiation (e.g., as illustrated in FIG. 2B). In embodiments, replica VNFs can be modified in an ongoing basis in two or all of before, during, and after their instantiation.

Thereafter, at 210, the replica VNFs can be tested to facilitate selection of a particular replica VNF identified as addressing the performance issue. Actions at 210 can include delivering replicated traffic and monitoring performance of the replica VNFs (and the selected production VNF) then scoring the performance to determine the costs and benefits of the modified replica VNFs in comparison to one another and the selected production VNF.

At 212, a replica VNF is selected based on the scoring. In an alternative embodiment, the selected production VNF can be selected if no replica VNF exceeds the selected production VNF's score or performance with respect to the performance issue. Thereafter, at 214, if a modified replica VNF was chosen based on scoring, the production VNF can be modified to include the modifications of the selected replica VNF as modified to address the performance issue. Thereafter, methodology 200 ends at 216, or in alternative embodiments may recycle to 204 to monitor the performance of the modified production VNF(s) and/or identify additional performance issues.

FIG. 2B illustrates another methodology 250 for automatically modifying a VNF. Methodology 250 begins at 252 and proceeds to 254 where VNF performance data of a plurality of VNFs can be monitored. At 256, a performance issue is identified based on monitored performance data.

In some embodiments (but not necessarily all embodiments), a VNF with an identified performance issue can be shattered at 258. Shattering can involve identifying subfunctions, interdependencies, influencing factors, et cetera, to identify constituents of the VNF. Modifications to and performance monitoring of the VNF can accordingly be observed and managed at a higher granularity, changing not only the entire function but smaller elements thereof. If shattering at 258 is completed, other aspects of methodology 250 will be impacted accordingly; for example, modification of replica VNFs at 264, performance monitoring at 270, and/or calculation of objective scores at 272 can be performed at increased granularity levels. Higher resolution or constituent-basis may be applied at other aspects of methodology 250 as well.

After 260 (or 262) methodology 250 instantiates one or more replica VNFs in one or more respective sandbox environments replicating the production environment of the selected production VNF having the identified performance issue. In embodiments alternative to that illustrated in FIG. 2B, the replica VNFs may be instantiated in a modified condition based on possible modifications related to the performance issue which were calculated or identified in advance.

In some embodiments (but not necessarily all embodiments), at 262 a playbook is searched to identify known VNF modifications which may address the performance issue. For example, various performance issues or classes of performance issues (e.g., related to a specific KPI) can include machine-calculated or administrator defined solutions (e.g., from previous fixes, calculated based on scenarios, provided by vendors or customers) to utilize in replicated environments for testing under current service loading. Plays (e.g., modified VNFs or VNF configurations) from the playbook can be identified (e.g., instantiate all plays, select particular plays based on context) and applied to replicated VNFs as described herein. If shattering at 258 was completed, plays can likewise be shattered into play constituents for matching to virtual constituents of the shattered functions, thereby allowing solutions to mix-and-match possible modifications for a candidate modification applied to a given replica VNF. The playbook can be supplemented with new plays, such as where a new solution is calculated through mathematics or network analysis; where an operator provides a new solution; or where shattering creates a combination defining a new play not yet stored in the playbook. The playbook can also store a current state before modifications are committed to a production VNF or production environment to provide instantaneous or on-demand rollback capability if a modification does not yield intended results or changed circumstances justify removal of the modified state (e.g., prior to making further modifications, modifications not needed based on current loading).

At 264, replica VNFs can be modified (e.g., according to solved mathematical problems, according to plays from a playbook, et cetera) to provide functioning alternatives to the selected production VNF. Each replica can be tested against the selected production VNF and other replicas to ascertain other possible performance changes that could be developed from the VNF modifications in view of actual conditions and context.

At 266, traffic to and from the selected production VNF (and/or a service or environment to which the selected production VNF belongs) is replicated. At 268, this traffic is delivered to the replicated VNFs to determine their performance in view of actual load and behavior.

At 270, performance data of the VNFs is monitored based on the real (to the selected production VNF) and replicated (to the replicated VNFs) traffic. Performance data is observed and collected for both the un-modified selected production VNF and modified replicated VNFs.

Based on this performance data, objective scores for the selected production VNF and replicated VNFs is calculated at 272. Scoring may objectively represent improvements by identifying positive and negative changes in the performance issue as quantifiable through KPI, SLA impact, or other measurable values. Scoring may weight particular values to greater or lesser significance, and may deduct or modify points based on costs incurred or weaknesses within a candidate modification (e.g., loss of redundancy). While scoring rules and processes can vary based on the particular VNF and goal, all replica VNFs and the selected production VNF can be scored according to a common scheme regardless of differences.

At 274, the selected production VNF and replicated VNFs are tested against one another based on their objective scores. Testing can include A/B testing where the performance of each VNF is tested against the other, adding competition to the solution process. Criteria beyond score comparison can be considered as well. For example, preferences or weighting can be provided for replica VNFs whose traffic and results show a degree of similarity to the parent network (providing trust that impact will be limited to intended results) or degree of variation (providing trust where design changes are limited to stay closer to the working arrangement).

In some embodiments (but not necessarily all embodiments), at 276 operator bias can be factored into testing. Alternatively, operator bias may be earlier-factored into scoring. Factoring can include receiving an external bias related to one or more of the candidate modifications in the form of an administrator input or other human-prompted action. This external bias can be used to weight, or in embodiments override, performance data values, objective scores, and/or testing thereof. In embodiments, operator bias can provide influential or dispositive control to an end user, whose experience is ultimately the product being served.

After 274 (or 276), methodology 250 proceeds to 278 where modification solution is calculated. This calculation is based on the "winner" of testing the various candidate modifications following their performance monitoring and scoring as modified. The winner can be the best-scoring solution or may be another solution based on constraints, user input, projected future states, interdependencies, et cetera.

Based on the modification solution calculated, the selected production VNF can be modified according to the selected solution at 280. In this manner, the VNF or its configuration is updated, automatically and rapidly in view of current cloud context, to address the identified performance issue. Thereafter, monitoring can continue to confirm the performance issue is resolved and/or identify other performance issues, or methodology 250 can proceed to terminate at 282.

In an example of methodologies 200 and/or 250, a cloud environment can use a three-tier architecture including a presentation tier, a business logic tier, and a data tier. In an embodiment, this architecture can support a business function. A business function can be, e.g., set of activities performed by the department that is initiated by an event, transform information, materials or business commitments, and produces an output (including but not limited to order fulfillment, invoicing, cash management, manufactured batch, customer response tracking, regulatory, and so forth). Business functions can be handled by one or more VNFs, either where they are handled electronically or where they are achieved through Internet of Things (IoT) functionality.

In an example, a company that has attached sensors to their delivery vehicle's batteries can monitor batteries to determine when they must be replaced. This IoT solution may be virtualized, thus introducing another layer of variability to a performance issue (which can be a problem such as connectivity issues per sensor that varies as the vehicles move through the world). Alternatively or complementarily, that same company may implement an IoT human resources solution whereby employees wear sensors that measure an array of variables from heath to productivity. These functions may thus not only become candidates for modification based on detected performance issues, but may also interrelate as they are modified. VNFs associated with these IoT solutions can be modified based on network conditions.

In another example, malicious attacks can be simulated against VNFs in sandbox environments to determine possible responses for such attacks. Whether malicious or incidental, events causing major disruptions can result in patterns (e.g., performance, traffic, resource use, et cetera) which can be identified and tagged to facilitate identification of plays for utilization in the presence of such patterns.

Figure 3:
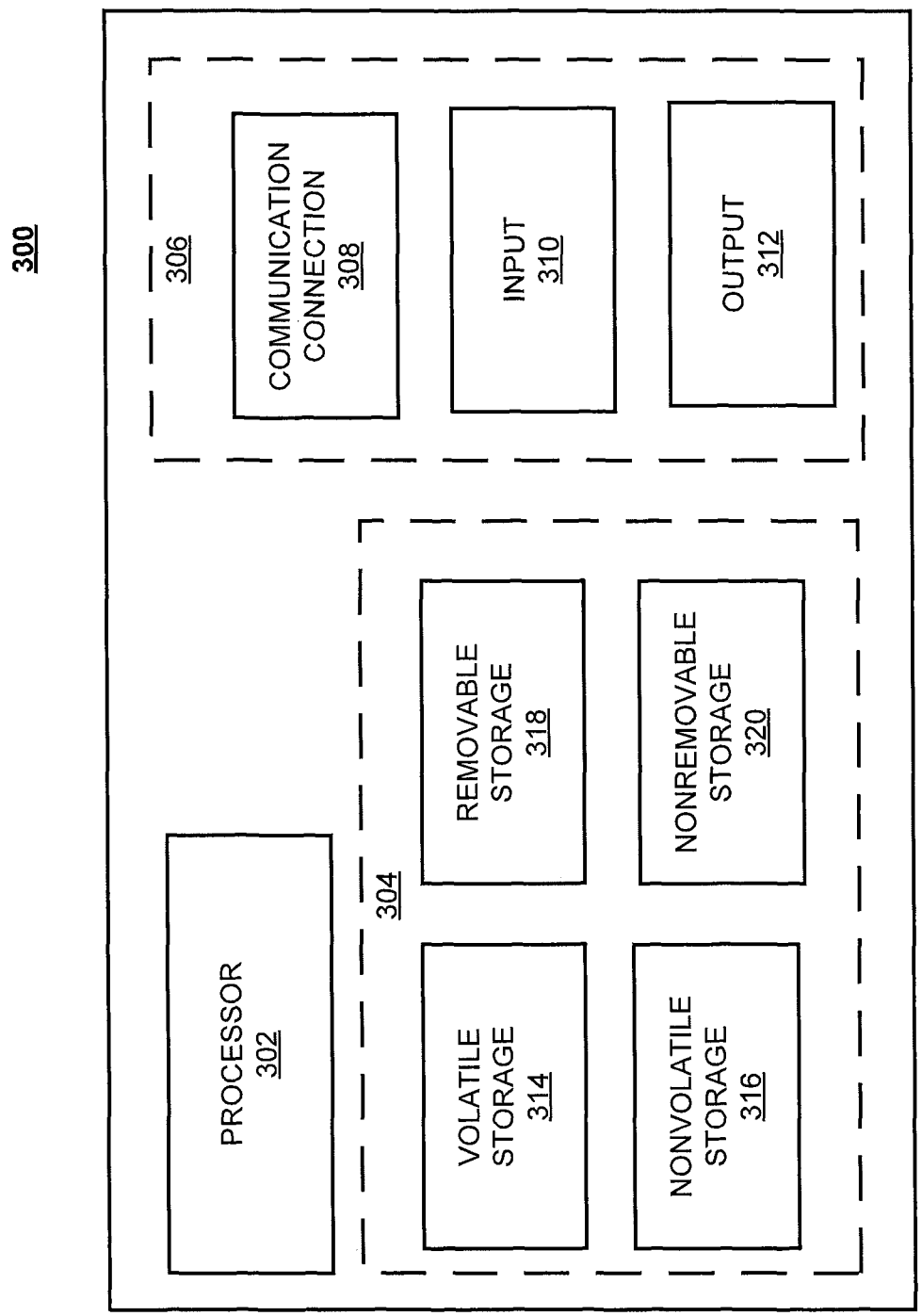
FIG. 3 is a schematic of an example device that may be a component of the system of FIG. 2A.

FIG. 3 is a block diagram of network device 300 that may be connected to or comprise a component of network 100. For example, network device 300 may implement one or more portions of methodologies 200 and/or 250 for placement of network components of application 102. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is example and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications there between. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
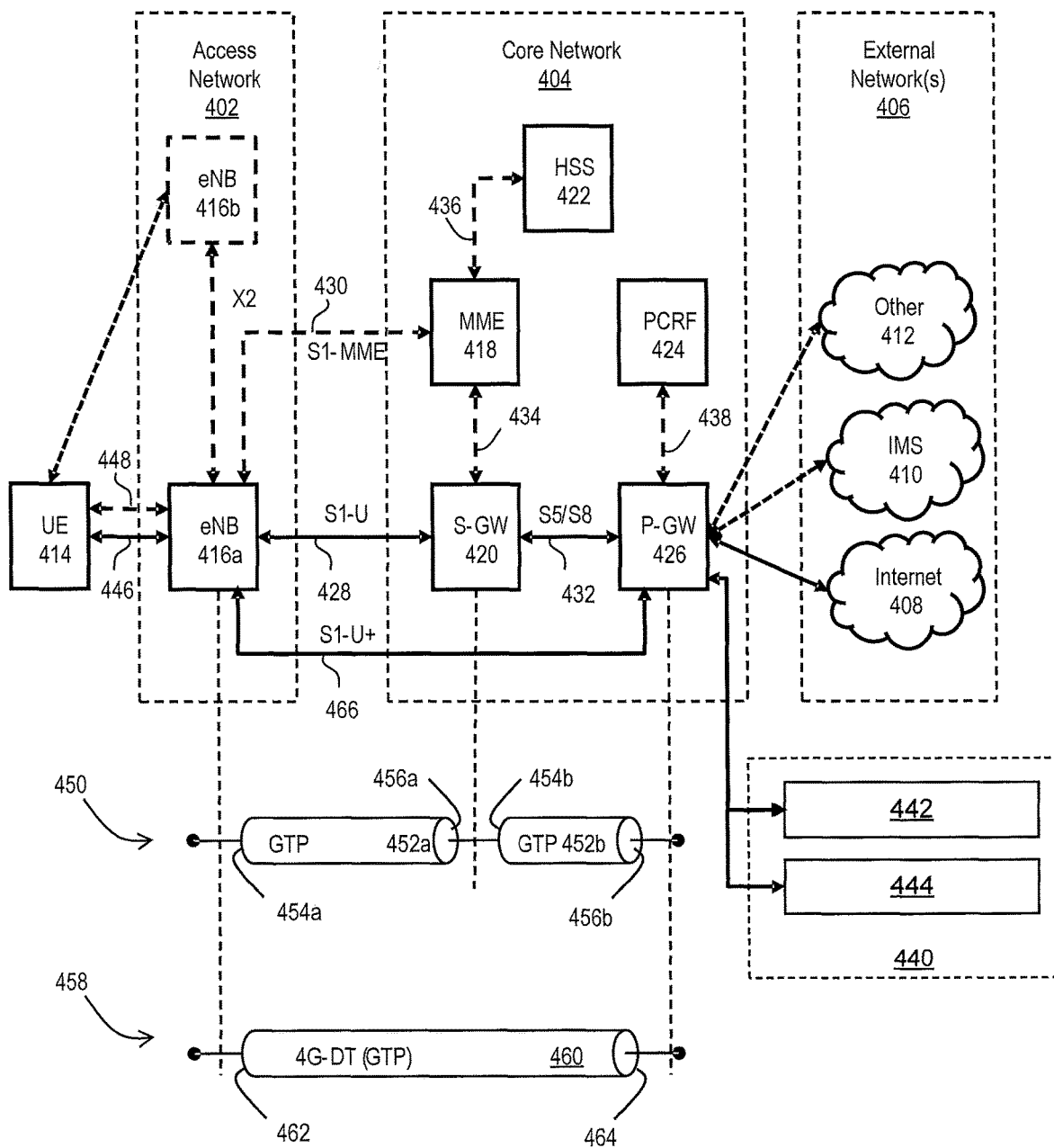
FIG. 4 depicts an example communication system that provide wireless telecommunication services over wireless communication networks upon which an application may be deployed using the disclosed systems or methods.

FIG. 4 illustrates a functional block diagram depicting one example of an LTE-EPS network architecture 400 that may be at least partially implemented as using virtualized functions. Network architecture 400 disclosed herein is referred to as a modified LTE-EPS architecture 400 to distinguish it from a traditional LTE-EPS architecture. While aspects of FIG. 4 and accompanying of network architecture 400 are discussed in relation to LTE, it is expressly noted that aspects herein can be alternatively or complementarily implemented in 5G (or other) network architectures without departing from the scope or spirit of the innovation.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP). network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core'network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service requirements for the user, et cetera. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
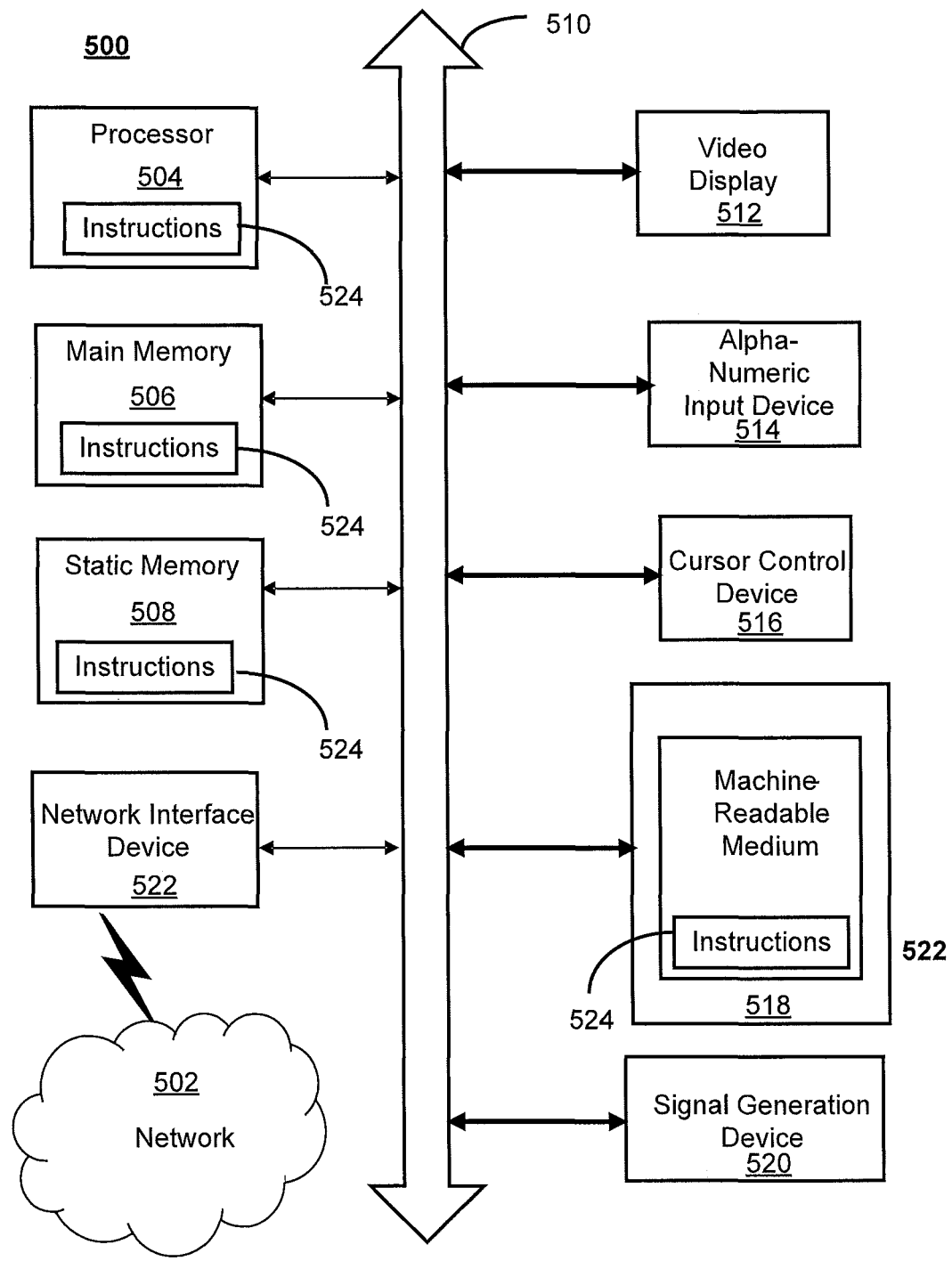
FIG. 5 depicts an example communication system that provide wireless telecommunication services over wireless communication networks that may be modeled using the disclosed systems and methods for configuring a virtualized network platform.

FIG. 5 depicts an example diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
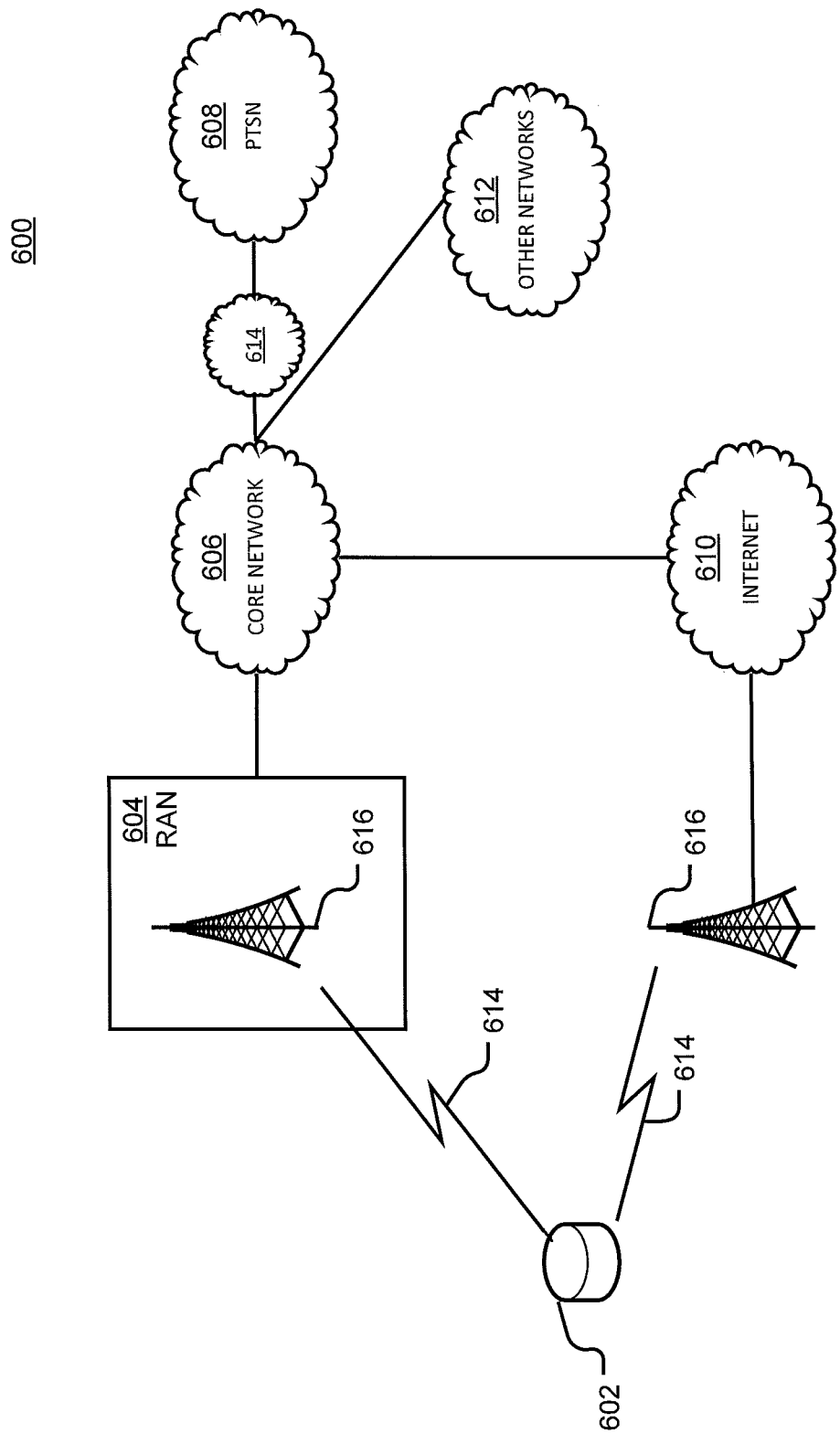
FIG. 6 is a diagram of an example telecommunications system in which the disclosed systems or methods may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614. As with other portions of this disclosure, while aspects relating to FIG. 6 are at times described in relation to LTE architectures, 5G architectures (and others) may be incorporated or utilized without departing from the scope or spirit of the innovation.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA).

WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, et cetera) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
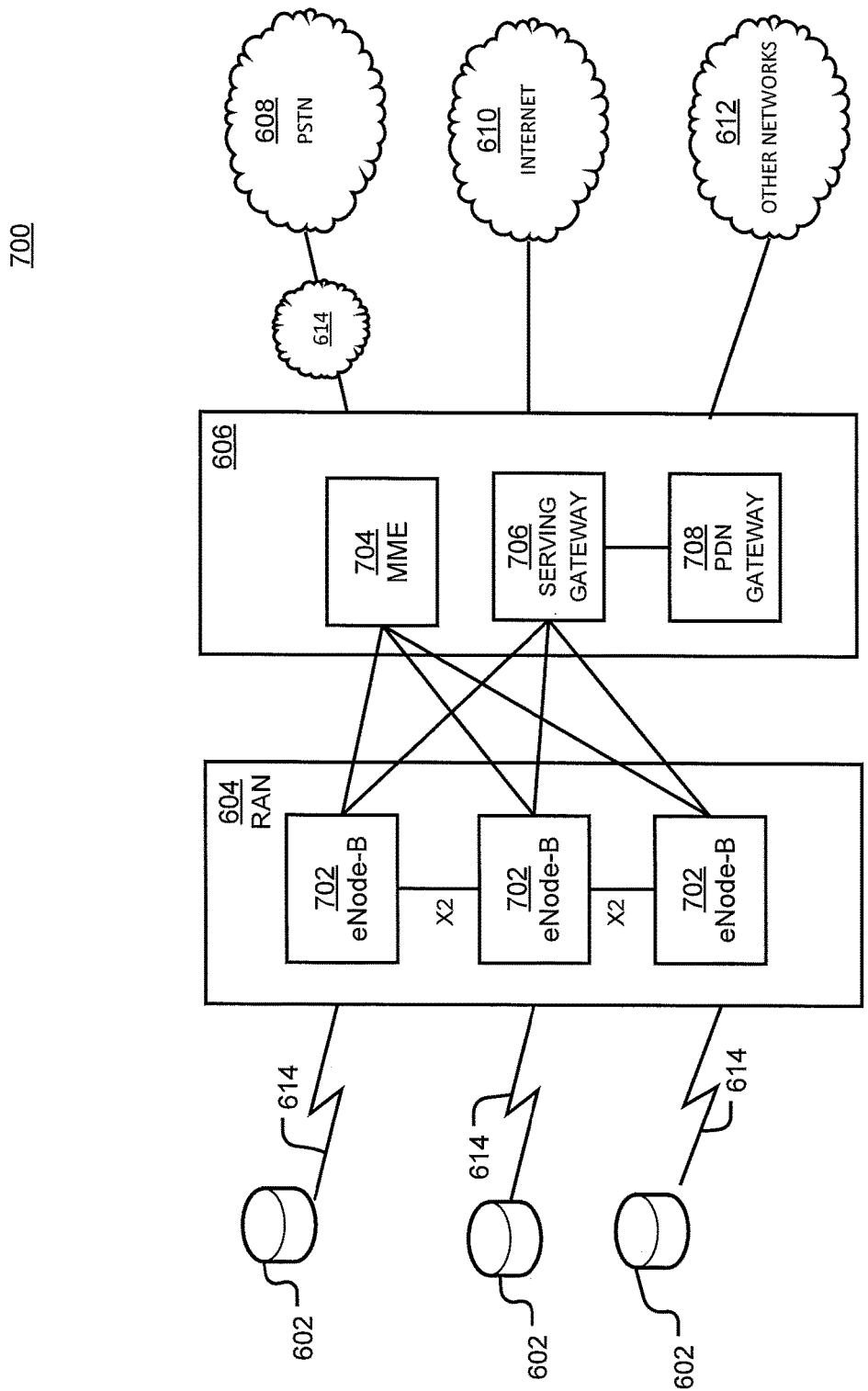
FIG. 7 is an example system diagram of a radio access network and a core network upon which an application may be deployed using the disclosed systems or methods.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

The methods and systems associated with VNF modification as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing content delivery as described herein. When implemented on a general-purpose processor, the program code combines with the processor to provide a unique device that operates to invoke the functionality of a streaming system.

While VNF modification systems and methods have been described in connection with the various examples of the various figures, it is to be understood that other similar implementations may be used or modifications and additions may be made to the described examples of a system or method without deviating therefrom. For example, one skilled in the art will recognize that a streaming system as described in the instant application may apply to other environments combining both local and network elements and components. Therefore, VNF modification systems and methods as described herein should not be limited to any single example, but rather should be construed in breadth and scope in accordance with the appended claims and other disclosed embodiments.

What is claimed is:

1. A method, comprising:
   monitoring performance data of a plurality of virtual network functions;
   receiving an indication of a performance issue in a selected production virtual network function among the plurality of virtual network functions, wherein the selected production virtual network function is in a production environment;
   in response to the indication of the performance issue, instantiating one or more replica virtual network functions in one or more sandbox environments, wherein the one or more replica virtual network functions replicate the selected production virtual network function, and wherein the one or more sandbox environments replicate the production environment;
   modifying the one or more replica virtual network functions according to candidate modifications based on the performance issue;
   evaluating the modified one or more replica virtual network functions using replicated production data of the production environment;
   calculating one or more replica objective scores based on the evaluating step;
   computing a modification solution related to the performance issue based on the calculating step;
   shattering the selected production virtual network function into virtual constituents,
      wherein the evaluating step performed using performance data of the replica virtual network functions as modified is conducted on a virtual constituent level,
      wherein the shattering involves identifying sub-functions, interdependencies, or influencing factors in order to identify constituents of the selected production virtual network function; and
   modifying the selected production virtual network function in accordance with the modification solution.

2. The method of claim 1, further comprising:
   searching a modification playbook containing a candidate set for the candidate modifications related to the performance issue,
   wherein the candidate modifications are based on one or more candidates of the candidate set.

3. The method of claim 1, further comprising:
   shattering the candidates of a candidate set from a modification playbook into play constituents; and
   searching the modification playbook for the candidate modifications related to the performance issue,
   wherein the candidate modifications are based on one or more candidates of the candidate set, and
   wherein the candidate modifications match play constituents to virtual constituents.

4. The method of claim 1, wherein the plurality of virtual network functions includes two or more proprietary customer virtual network functions associated with two or more customers.

5. The method of claim 1, wherein the performance data varies for two or more virtual network functions among the plurality of virtual network functions.

6. The method of claim 1, wherein the performance issue is identified based on a Key Performance Indicator value.

7. The method of claim 1, wherein the modifying of the one or more replica virtual network functions is based on an adversarial technique, the adversarial technique provides different options that are used against one another according to a cost model or through a hallucination of data.

8. The method of claim 1, wherein the performance issue is identified based on an aspirational performance goal.

9. The method of claim 1, further comprising:
   receiving an external bias related to one or more of the candidate modifications,
   wherein at least a portion of the objective scores is weighted according to the external bias.

10. The method of claim 1, wherein the replicated production data comprises replicated traffic to and from the production virtual network function.

11. An apparatus comprising:
    a processor; and
    a memory coupled with the processor, the memory storing executable instructions that when executed by the processor cause the processor to effectuate operations comprising:
       monitoring performance data of a plurality of virtual network functions;
       receiving an indication of a performance issue in a selected production virtual network function among the plurality of virtual network functions, wherein the selected production virtual network function is in a production environment;
       in response to the indication of the performance issue, instantiating one or more replica virtual network functions in one or more sandbox environments wherein the one or more replica virtual network functions replicate the selected production virtual network function, and wherein the one or more sandbox environments replicate the production environment;
       modifying the one or more replica virtual network functions according to candidate modifications based on the performance issue;
       evaluating the modified one or more replica virtual network functions using replicated production data of the production environment;
       calculating one or more replica objective scores based on the evaluating step;

computing a modification solution related to the performance issue based on the calculating step;
shattering the selected production virtual network function into virtual constituents,
wherein the evaluating step performed using performance data of the replica virtual network functions as modified is conducted on a virtual constituent level,
wherein the shattering involves identifying sub-functions, interdependencies, or influencing factors in order to identify constituents of the selected production virtual network function; and
modifying the selected production virtual network function in accordance with the modification solution.

12. The apparatus of claim 11, wherein the performance issue is identified based on a Key Performance Indicator value.

13. The apparatus of claim 11, wherein the modifying of the one or more replica virtual network functions is based on an adversarial technique, the adversarial technique provides different options that are used against one another according to a cost model or through a hallucination of data-points.

14. The apparatus of claim 11, wherein the performance issue is identified based on an aspirational performance goal.

15. The apparatus of claim 11 receiving an external bias related to one or more of the candidate modifications, wherein at least a portion of the objective scores is weighted according to the external bias.

16. A system comprising:
one or more processors; and
memory coupled with the one or more processors, the memory storing executable instructions that when executed by the one or more processors cause the one or more processors to effectuate operations comprising:
monitoring performance data of a plurality of virtual network functions;
receiving an indication of a performance issue in a selected production virtual network function among the plurality of virtual network functions, wherein the selected production virtual network function is in a production environment;
in response to the indication of the performance issue, instantiating one or more replica virtual network functions in one or more sandbox environments wherein the one or more replica virtual network functions replicate the selected production virtual network function, and wherein the one or more sandbox environments replicate the production environment;
modifying the one or more replica virtual network functions according to candidate modifications based on the performance issue;
evaluating the modified one or more replica virtual network functions using replicated production data of the production environment;
calculating one or more replica objective scores based on the evaluating step;
computing a modification solution related to the performance issue based on the calculating step;
shattering the selected production virtual network function into virtual constituents,
wherein the evaluating step performed using performance data of the replica virtual network functions as modified is conducted on a virtual constituent level,
wherein the shattering involves identifying sub-functions, interdependencies, or influencing factors in order to identify constituents of the selected production virtual network function; and
modifying the selected production virtual network function in accordance with the modification solution.

17. The system of claim 16, wherein the performance issue is identified based on a Key Performance Indicator value.

18. The system of claim 16, wherein the modification scorer employs an adversarial technique, provides different options that are used against one another according to a cost model or through a hallucination of data-points.

19. The system of claim 16, wherein the performance issue is identified based on an aspirational performance goal.

* * * * *